(12) United States Patent
Huang et al.

(10) Patent No.: US 9,212,906 B2
(45) Date of Patent: Dec. 15, 2015

(54) DEVICE FOR DETECTING AXIS COPLANARITY OF ORTHOGONAL ROTARY SHAFTS HAVING BUILT-IN INTERSECTION AND PRECISION DETECTING METHOD

(75) Inventors: Yumei Huang, Xi'an Shaanxi (CN);
Xingang Yang, Xi'an Shaanxi (CN);
Weigang Lv, Xi'an Shaanxi (CN);
Longfei Zhang, Xi'an Shaanxi (CN);
Tongqing Liu, Xi'an Shaanxi (CN)

(73) Assignee: XI'AN UNIVERSITY OF TECHNOLOGY, Xi'an Shaanxi (CN)

( * ) Notice: Subject to any disclaimer, the term of this patent is extended or adjusted under 35 U.S.C. 154(b) by 103 days.

(21) Appl. No.: 14/352,580

(22) PCT Filed: Jun. 28, 2012

(86) PCT No.: PCT/CN2012/077737
§ 371 (c)(1),
(2), (4) Date: Apr. 17, 2014

(87) PCT Pub. No.: WO2013/063946
PCT Pub. Date: May 10, 2013

(65) Prior Publication Data
US 2014/0298668 A1    Oct. 9, 2014

(30) Foreign Application Priority Data

Oct. 31, 2011    (CN) .......................... 2011 1 0335590

(51) Int. Cl.
*G01B 21/24*    (2006.01)
*G01B 5/012*    (2006.01)

(52) U.S. Cl.
CPC ............... *G01B 21/24* (2013.01); *G01B 5/012* (2013.01)

(58) Field of Classification Search
CPC .......... G01B 21/24; G01B 5/012; G01B 5/28; G01B 5/24; G01B 5/25; G01B 5/252
USPC ............................ 33/412, 645, 613, 533, 661
See application file for complete search history.

(56) References Cited

U.S. PATENT DOCUMENTS

| | | | | | |
|---|---|---|---|---|---|
| 4,367,594 | A | * | 1/1983 | Murray, Jr. ............... | G01B 5/25 |
| | | | | | 33/412 |
| 4,413,415 | A | * | 11/1983 | Stovall ..................... | G01B 5/25 |
| | | | | | 33/412 |

(Continued)

FOREIGN PATENT DOCUMENTS

| CN | 101619960 A | 1/2010 |
|---|---|---|
| CN | 201593974 U | 9/2010 |

(Continued)

*Primary Examiner* — Yaritza Guadalupe-McCall
(74) *Attorney, Agent, or Firm* — Dickstein Shapiro LLP

(57) ABSTRACT

The present invention discloses a device for detecting axis coplanarity of orthogonal rotary shafts having a built-in intersection, wherein a front assembly rotary body is coaxially connected on a front assembly housing, the front assembly rotary body and a rear assembly housing are fixedly connected with each other, the rear assembly rotary body is mounted in the rear assembly housing, a first three dimension movement fine tuning mechanism is mounted at an end of the rear assembly rotary body, the first three dimension movement fine tuning mechanism is connected with a standard sphere through a connecting rod, the three dimension movement fine tuning mechanisms are provided in the horizontal direction of the standard sphere and below the standard sphere in vertical direction, and two non-contact displacement sensors are mounted on said two three dimension movement fine tuning mechanisms respectively. The present invention also discloses a precision measurement method for measuring axis coplanarity of the orthogonal rotary shafts having a built-in intersection by using the above device, having a feature of high measurement precision, which is adaptive to coplanarity detections for the cantilever-type orthogonal shafts having a built-in intersection and the clamp-type orthogonal shafts having a built-in intersection.

3 Claims, 4 Drawing Sheets

(56) References Cited

U.S. PATENT DOCUMENTS

| | | | | |
|---|---|---|---|---|
| 4,516,328 A * | 5/1985 | Massey | G01B 5/252 | 33/412 |
| 4,996,439 A * | 2/1991 | Linker | H05K 13/08 | 33/645 |
| 5,045,710 A * | 9/1991 | Linker, Sr. | G01N 21/95607 | 33/645 |
| 5,056,237 A * | 10/1991 | Saunders | G01B 5/25 | 33/1 PT |
| 5,371,953 A * | 12/1994 | Nower | G01B 5/25 | 33/412 |
| 5,435,073 A * | 7/1995 | Sullivan | G01B 5/25 | 33/412 |
| 5,479,718 A * | 1/1996 | Cook | G01B 5/25 | 33/412 |
| 6,151,793 A * | 11/2000 | Carlen | G01D 5/34738 | 33/412 |
| 8,037,615 B2 * | 10/2011 | Glaser | G01B 11/272 | 33/286 |
| 8,472,033 B2 * | 6/2013 | Takeda | F01K 13/02 | 33/412 |
| 2011/0149300 A1 * | 6/2011 | Takeda | F01K 13/02 | 356/614 |
| 2014/0298668 A1 * | 10/2014 | Huang | G01B 5/012 | 33/645 |
| 2015/0226536 A1 * | 8/2015 | Huang | G01B 5/285 | 33/533 |

FOREIGN PATENT DOCUMENTS

| | | |
|---|---|---|
| CN | 102022991 A | 4/2011 |
| CN | 102072700 A | 5/2011 |
| CN | 102384732 A | 3/2012 |
| DE | 198 23 942 C1 | 10/1999 |
| WO | WO 91/06845 A2 | 5/1991 |
| WO | WO 02/27267 A1 | 4/2002 |

* cited by examiner

DEVICE FOR DETECTING AXIS COPLANARITY OF ORTHOGONAL ROTARY SHAFTS HAVING BUILT-IN INTERSECTION AND PRECISION DETECTING METHOD

TECHNICAL FIELD

The present invention belongs to the technical field of geometric precision detection of a rotary motion device, which involves a device for detecting axis coplanarity of orthogonal rotary shafts having a built-in intersection, and the present invention also involves a precision detecting method for detecting axis coplanarity of orthogonal rotary shafts having a built-in intersection.

DESCRIPTION OF THE RELATED ART

In many cases, the machine has the orthogonal, intersection built-in rotary motion shafts, for example, the orthogonal, intersection built-in A-axis (or B-axis) and the C-axis, A-axis (or B-axis) and electric spindle in the coordinate measuring machine and the five-axis CNC machine tools, as well as the orthogonal, intersection built-in rotary joints connected in series in robots all belong to to the orthogonal, intersection built-in rotary motion shafts. The axis coplanarity precision of the orthogonal, intersection built-in rotary shafts has a significant impact on the geometric precision of the entire machine. When the axes of two rotary motion shafts are perpendicular with each other while the point of intersection lies within the structure, the shafts are referred to as the orthogonal, intersection built-in rotary shafts. Since the intersection is built-in, the detection cannot be performed directly at the position of intersection. The applicable high precision detecting device for detecting the axis coplanarity of the orthogonal, intersection built-in rotary shafts is still lacking in the prior art, hence the high precision measurement in the related field cannot be directly carried out.

SUMMARY

An aspect of the present invention is to provide a device for measuring axis coplanarity of orthogonal rotary shaft having a built-in intersection, which solves the problem of inability of high precision detection by the existing device for detecting axis coplanarity of orthogonal rotary shaft having a built-in intersection.

Another object of the present invention is also to provide a precision detecting method for detecting axis coplanarity of the orthogonal rotary shafts having a built-in intersection.

The technical solution adopted by the present invention is: a device for detecting axis coplanarity of orthogonal rotary shafts having a built-in intersection, wherein a structure having the orthogonal rotary shafts having a built-in intersection includes a fixing bracket, a front assembly housing and a rear assembly housing, the front assembly housing fixedly mounted on the fixing bracket, a front assembly rotary body coaxially connected on the front assembly housing, the front assembly rotary body and the rear assembly housing fixedly connected with each other, and the rear assembly rotary body mounted in the rear assembly housing, wherein the measurement device includes: a first three dimensional movement fine tuning mechanism mounted at an end of the rear assembly rotary body, and connecting with a standard sphere through a horizontal connecting rod; a second three dimensional movement fine tuning mechanism vertically provided below the standard sphere, and provided with a first non-contact displacement sensor at an end of the second three dimensional movement fine tuning mechanism corresponding to the standard sphere; a third three dimensional movement fine tuning mechanism provided corresponding to the horizontal direction of the standard sphere, and provided with a second non-contact displacement sensor at an end of the third three dimensional movement fine tuning mechanism corresponding to the standard sphere. The second three dimensional movement fine tuning mechanism and the third three dimensional movement fine tuning mechanism (9) are fixedly mounted on the fixing bracket.

Another technical solution adopted by the present invention is to provide a precision detecting method for detecting axis coplanarity of the orthogonal rotary shafts having a built-in intersection using the above mentioned device, which is implemented through the following steps:

step 1: adjusting the first three dimensional movement fine tuning mechanism, so as to position the center of the standard sphere in a plane containing the rotary axis of the rear assembly rotary body and perpendicular to the rotary axis of the front assembly rotary body, and to enable the vertical distance from the center of the standard sphere to the rotary axis of the front assembly rotary body to be $\sqrt{2}$ times the distance from the center of the standard sphere to the rotary axis of the rear assembly rotary body;

step 2: adjusting the second three dimensional movement fine tuning mechanism and the third three dimensional movement fine tuning mechanism, so as to position the measuring head of the first non-contact displacement sensor and the measuring head of the second non-contact displacement sensor in a plane containing the rotary axis of the rear assembly rotary body and perpendicular to the rotary axis of the front assembly rotary body, wherein the measuring head of the first non-contact displacement sensor is parallel with the rotary axis of the rear assembly rotary body, and the measuring head of the second non-contact displacement sensor is perpendicular to the rotary axis of the rear assembly rotary body;

step 3: adjusting the second three dimensional movement fine tuning mechanism and the third three dimensional movement fine tuning mechanism, so as to align the measuring head of the first non-contact displacement sensor and the measuring head of the second non-contact displacement sensor b with the maximum radius of the standard sphere, while keeping the measuring heads of the first and second non-contact displacement sensors in the plane containing the rotary axis of the rear assembly rotary body and perpendicular to the rotary axis of the front assembly rotary body, wherein the measuring head of the first non-contact displacement sensor is parallel with the rotary axis of the rear assembly rotary body, and the measuring head of the second non-contact displacement sensor is perpendicular to the rotary axis of the rear assembly rotary body, so as to adjust the measuring device to a first measuring status;

step 4: reading the measurement value $\delta_{a1}$ of the first non-contact displacement sensor and the measurement value $\delta_{b1}$ of the second non-contact displacement sensor under the first detecting status;

step 5: first, rotating the rear assembly rotary body by 180°, then rotating the front assembly rotary body by 90°, so as to adjust the detecting device to a second detecting status;

step 6: reading the measurement value $\delta_{a2}$ of the first non-contact displacement sensor and the measurement value $\delta_{b2}$ of the second non-contact displacement sensor under the second detecting status;

step 7: comparing the measurement values under the detecting status 1 and detecting status 2, so as to calculate the reading difference $\Delta_a$ of the first non-contact displacement sensor and the reading difference $\Delta_b$ of the second non-contact displacement sensor between the first detecting status and the second detecting status, wherein $\Delta_a=\delta_{a2}-\delta_{a1}$, $\Delta_b=\delta_{b2}-\delta_{b1}$;

step 8: comparing $\Delta_a$ and $\Delta_b$, wherein when the difference between $\Delta_a$ and $\Delta_b$ is smaller than or equal to a preset value, the offset value e of the axis coplanarity of the orthogonal rotary shafts having a built-in intersection can be obtained through the following formula:

$$e=(\Delta_a+\Delta_b)/2;\text{ and}$$

when the difference between $\Delta_a$ and $\Delta_b$ is larger than the preset value, fine tuning the first three dimensional movement fine tuning mechanism (5) so as to slightly change the position of the center of the standard sphere (7), while keeping the center of the standard sphere (7) in the plane containing the rotary axis of the rear assembly rotary body (4) and perpendicular to the rotary axis of the front assembly rotary body (2), and rotating the rear assembly rotary body (4) by 180° first, then rotating the front assembly rotary body (2) by −90°; and repeating steps 3-8, until $\Delta_a \approx \Delta_b$; and step 9: the offset value e of the axis coplanarity of the orthogonal rotary shafts having a built-in intersection can be obtained through the following formula:

$$e=(\Delta_a+\Delta_b)/2.$$

The advantageous effects of the present disclosure are: 1) the precision of the detection is high: ① only the rotation movements of the two orthogonal rotary shaft assemblies as the detected objects occurs during the measurement (i.e. rotating the rear rotary body by 180° and rotating the front rotary body by) 90°), without using movements of other axes, and thus the interference caused by the errors when detecting other movements can be avoided; ② using two non-contact displacement sensors to measure the coplanarity at the same time equalizes the measurement errors; ③ using the precise fine tuning may accurately align the measuring head of the non-contact displacement sensor with the maximum radius of the standard sphere. 2) The present disclosure is adaptive to the coplanarity detection of cantilever-type orthogonal shafts having a built-in intersection and clamp-type orthogonal shafts (in which the housing of the front rotary assembly resembles a clamp, which has two rotary bodies arranged symetrically rotating synchronously).

The drawings include the following reference marks: 1. front assembly housing; 2. front assembly rotary body; 3. rear assembly housing; 4. rear assembly rotary body; 5. first three dimension movement fine tuning mechanism; 6. connecting rod; 7. standard sphere; 8. second three dimension movement fine tuning mechanism; and 9. third three dimension movement fine tuning mechanism.

In addition, the drawings further include the following reference marks: a. first non-contact displacement sensor; b. second non-contact displacement sensor.

DETAILED DESCRIPTION OF EXEMPLARY EMBODIMENTS

Figure 1:
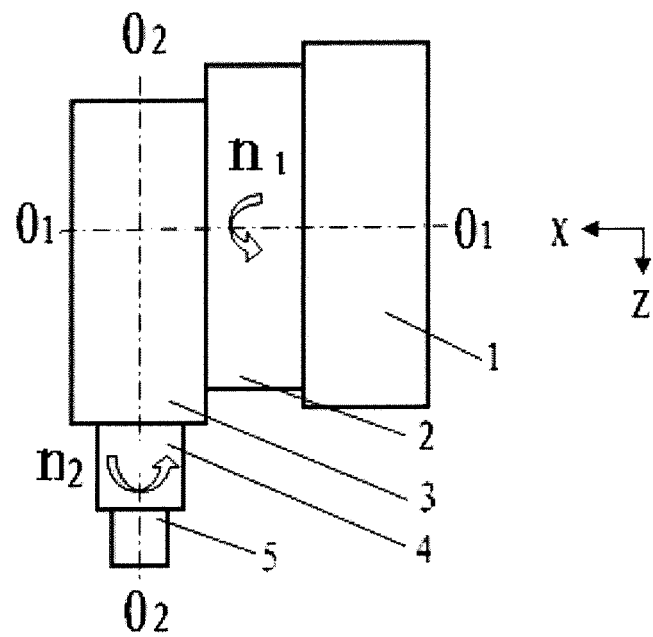
FIG. 1 is a side structural schematic view of a structure to be detected.

As shown in FIG. 1, the structure having the axis of orthogonal rotary shaft having a built-in intersection detected by the detecting device according to the present invention is: a front assembly rotary body 2 is coaxially connected on a front assembly housing 1; the front assembly rotary body 2 is fixedly connected with a rear assembly housing 3; and a rear assembly rotary body 4 is mounted in the rear assembly housing 3. A first three dimension movement fine tuning mechanism 5 is mounted at the end of the rear assembly rotary body 4.

As shown in FIGS. 2-5, $n_1$ represents rotating around the axis of the front assembly rotary body 2, $n_2$ represents rotating around the axis of the rear assembly rotary body 4, $O_1O_1$ is the design rotary axis of the front assembly rotary body 2, $O_2O_2$ is the design rotary axis of the rear assembly rotary body 4, $O_{22}O_{22}$ is the actual offset axis when a deviation occurs to the rotary axis of the rear assembly rotary body 4, the intersection $O_1$ is the intersection between the plane containing the rotary axis $O_2O_2$ of the rear assembly rotary body 4 and perpendicular to the rotary axis $O_1O_1$ of the front assembly rotary body 2 and the rotary axis of the front assembly rotary body 2, the intersection $O_{11}$ is the intersection between the plane containing the rotary offset axis $O_{22}O_{22}$ of the rear assembly rotary body 4 and perpendicular to the rotary axis $O_1O_1$ of the front assembly rotary body 2 and the rotary axis of the front assembly rotary body 2 when a deviation occurs, point $O_4$ is the center of the standard sphere 7, line $O_3O_4$ is the vertical line passing through the center point $O_4$ and perpendicular to the rotary axis $O_2O_2$ of the rear assembly rotary body 4, $O_3$ is the perpendicular foot, hence point $o_3$ is always on the axis $O_2O_2$, and thus the line $O_2O_3$ in FIGS. 2-5 is actually the rotary axis $O_2O_2$ of the rear assembly rotary body 4, $L_1$ is the vertical distance from the center point $O_4$ to the rotary axis $O_1O_1$ of the front assembly rotary body 2, $L_2$ is the vertical distance from the center point $O_4$ to the rotary axis $O_2O_2$ of the rear assembly rotary body 4, and e is the coplanarity offset between the rotary axis $O_1O_1$ of the front assembly rotary body 2 and the rotary axis $O_2O_2$ of the rear assembly rotary body 4.

In theory, the rotary axis of the front assembly rotary body 2 and the rotary axis of the rear assembly rotary body 4 should intersect with each other (i.e. existing in the same plane, or coplanar). However, the two axes may not actually exist in the same plane due to the assembly error, hence the coplanarity error e might occur, and said value e is measured on the common perpendicular line with reference to $O_1O_1$.

Figure 2:
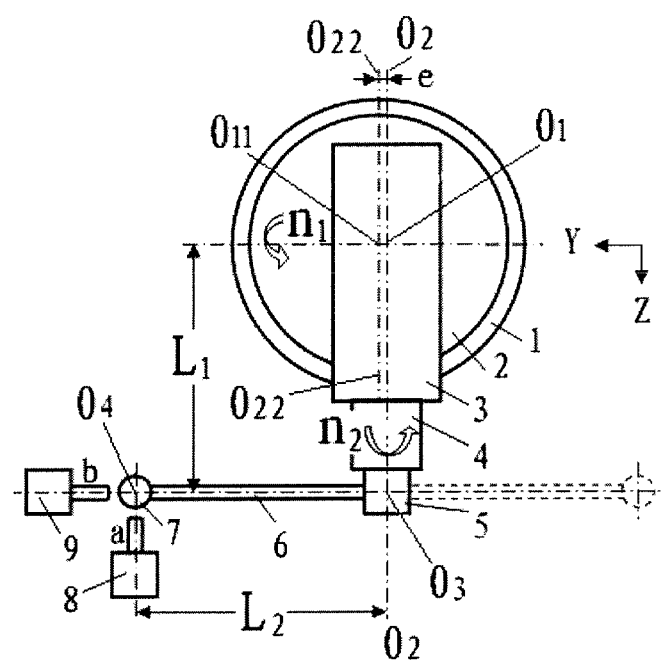
FIG. 2 is a front structural view of the device according to the present invention in detecting status 1.
Figure 3:
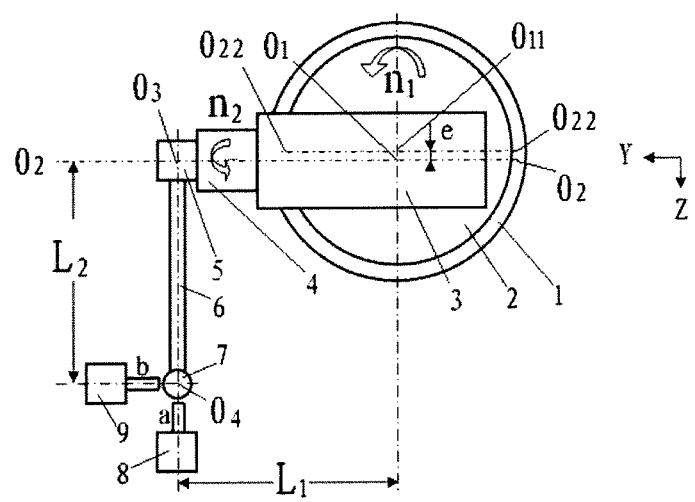
FIG. 3 is a front structural view of the device according to the present invention in detecting status 2.

The first three dimension movement fine tuning mechanism 5 is connected with the standard sphere 7 through the horizontally set connecting rod 6; the third three dimension movement fine tuning mechanism 9 and the second non-contact displacement sensor b mounted thereon (in the Y direction) are provided correspondingly in the horizontal direction of the standard sphere 7; the second three dimension movement fine tuning mechanism 8 and the first non-contact displacement sensor a mounted thereon (in the Z direction) are provided vertically below the standard sphere 7, i.e. the detecting status 1 according to the present invention, referring to FIG. 2;

first, rotating the rear assembly rotary body 4 by 180°, then rotating the front assembly rotary body 2 by 90°, i.e. the detecting status 2 according to the present invention, referring to FIG. 3.

The center of the standard sphere 7, the measuring heads of the first and second non-contact displacement sensors a and b are arranged in the plane containing the rotary axis $O_2O_3$ of the rear assembly rotary body 4 and perpendicular to the rotary axis of the front assembly rotary body 2, wherein the measuring head of the first non-contact displacement sensor a is parallel with the rotary axis $O_2O_3$ of the rear assembly rotary body 4, and the measuring head of the second non-contact displacement sensor b is perpendicular to the rotary axis $O_2O_3$ of the rear assembly rotary body 4, and the measuring heads of the first non-contact displacement sensor a and second non-contact displacement sensor b are aligned with the maximum radius of the standard sphere 7.

The detecting objects of the device according to the present invention are two orthogonal rotary shaft assemblies having a built-in intersection, in which the front rotary shaft assembly mainly includes the front assembly housing 1 and the front assembly rotary body 2, while the rear rotary shaft assembly mainly includes the rear assembly housing 3 and the rear assembly rotary body 4, and the rear assembly housing 3 of the rear rotary shaft assembly is fixedly connected with the front assembly rotary body 2. The second three dimension movement fine tuning mechanism 8 and the third three dimension movement fine tuning mechanism 9 are fixedly mounted on a fixing bracket (not shown in the drawing) which is stationary with respect to the front assembly housing 1. The above three three dimension movement fine tuning mechanisms can all be precisely fine tuned in three directions perpendicular to one another.

Figure 4:
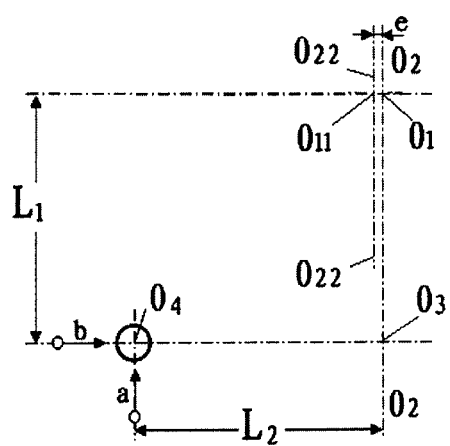
FIG. 4 is a simplified view of the detecting principle in the detecting status 1 in the method according to the present invention.
Figure 5:
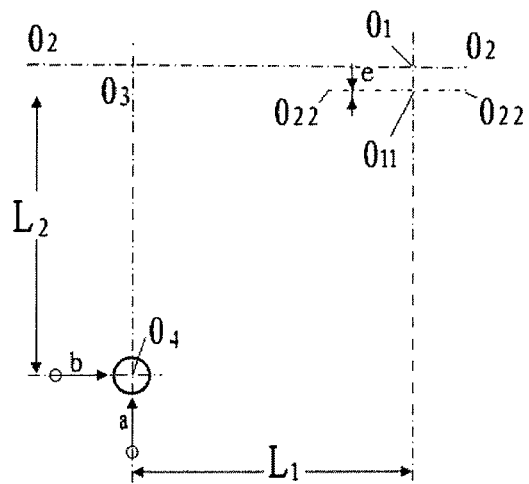
FIG. 5 is a simplified view of the detecting principle in the detecting status 2 in the method according to the present invention.

The detecting method according to the present invention using the above mentioned device provides a precision detection for axis coplanarity of the orthogonal rotary shafts having a built-in intersection. Referring to FIGS. 4 and 5, taking the orthogonal shafts of the A shaft and the electric spindle of the CNC machine tools as an example, under the XYZ coordinate system, the X axis coincides with the rotary axis of the front rotary shaft assembly, and the Z axis theoretically coincides with the rotary axis of the rear rotary shaft assembly, the above-mentioned method is implemented through the following steps:

step 1: adjusting the first three dimensional movement fine tuning mechanism 5, so as to position the center of the standard sphere 7 in a plane containing the rotary axis of the rear assembly rotary body 4 and perpendicular to the rotary axis of the front assembly rotary body 2, and to enable the vertical distance from the center of the standard sphere 7 to the rotary axis of the front assembly rotary body 2 to be $\sqrt{2}$ times the distance from the center of the standard sphere 7 to the rotary axis of the rear assembly rotary body 4;

step 2: adjusting the second three dimensional movement fine tuning mechanism 8 and the third three dimensional movement fine tuning mechanism 9, so as to position the measuring head of the first non-contact displacement sensor a and the measuring head of the second non-contact displacement sensor b in a plane containing the rotary axis of the rear assembly rotary body 4 and perpendicular to the rotary axis of the front assembly rotary body 2, wherein the measuring head of the first non-contact displacement sensor a is parallel with the rotary axis of the rear assembly rotary body 4, and the measuring head of the second non-contact displacement sensor b is perpendicular to the rotary axis of the rear assembly rotary body 4;

step 3: adjusting the measurement device to the detecting status 1:

(i) adjusting the second three dimensional movement fine tuning mechanism 8 and the third three dimensional movement fine tuning mechanism 9, so as to align the measuring head of the first non-contact displacement sensor a and the measuring head of the second non-contact displacement sensor b with the maximum radius of the standard sphere 7, while keeping the measuring heads of the first and second non-contact displacement sensors a and b still in the plane containing the rotary axis of the rear assembly rotary body 4 and perpendicular to the rotary axis of the front assembly rotary body, wherein the measuring head of the first non-contact displacement sensor a is parallel with the rotary axis of the rear assembly rotary body 4, and the measuring head of the second non-contact displacement sensor b is perpendicular to the rotary axis of the rear assembly rotary body 4; and (ii) reading the measurement value $\delta_{a1}$ of the first non-contact displacement sensor a and the measurement value $\delta_{b1}$ of the second non-contact displacement sensor b under the detecting status 1;

step 4: adjusting the measurement device to the detecting status 2:

☐ first, rotating the rear assembly rotary body 4 by 180°, then rotating the front assembly rotary body 2 by 90°, and setting the status after the rotation as the detecting status 2; and ② reading the measurement value $\delta_{a2}$ of the first non-contact displacement sensor a and the measurement value $\delta_{b2}$ of the second non-contact displacement sensor b under the detecting status 2;

step 5: comparing the measurement values of the detecting status 1 and the detecting status 2:

① calculating the reading difference of the first non-contact displacement sensor a under the detecting status 1 and detecting status 2, $\Delta_a = \delta_{a2} - \delta_{a1}$; and the reading difference of the second non-contact displacement sensor b under the detecting status 1 and detecting status 2, $\Delta_b = \delta_{b2} - \delta_{b1}$;

② comparing $\Delta_a$ and $\Delta_b$; when the difference between $\Delta_a$ and $\Delta_b$ is larger than a preset value (e.g. one thousandth or one ten-thousandth or a value of other levels), fine tuning the first three dimensional movement fine tuning mechanism 5 so as to slightly change the position of the center of the standard sphere 7, while still keeping the center of the standard sphere 7 in the plane containing the rotary axis of the rear assembly rotary body 4 and perpendicular to the rotary axis of the front assembly rotary body 2; and ③ first, rotating the rear assembly rotary body 4 by 180°, then rotating the front assembly rotary body 2 by −90°, i.e., returning to the detecting status 1;

step 6: repeating steps 3-5, until reaching $\Delta_a \approx \Delta_b$ (the difference between $\Delta_a$ and $\Delta_b$ lies within an error scope for a set value); and step 7: the offset value e of the axis coplanarity of the orthogonal rotary shafts having a built-in intersection can be obtained through the following formula:

$$e=(\Delta_a+\Delta_b)/2.$$

Figure 6:
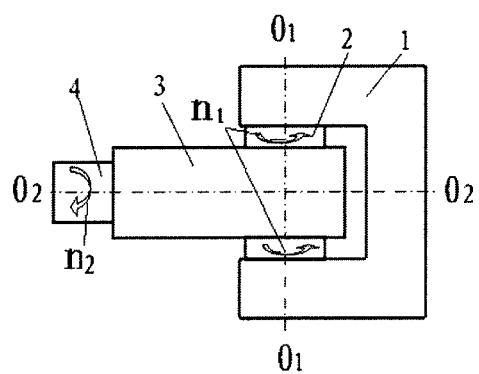
FIG. 6 is a structural schematic view of clamp-type orthogonal shafts having a built-in intersection adaptive to the detecting device and method according to the present invention, wherein the front rotary shaft assembly is a swing feeding component, and the rear rotary shaft assembly is an electric spindle.

FIG. 6 shows a second detecting object adaptive to the detecting device and method according to the present invention, that is, FIG. 6 is a diagram of the clamp-type orthogonal shafts having a built-in intersection, wherein the front rotary shaft assembly is a swing feeding component, and the rear rotary shaft assembly is an electric spindle, e.g. in the CNC machine tools, wherein $n_1$ represents the swing of the component 3 around the feeding shaft $O_1O_1$, $n_2$ represents the electric spindle 4 rotating around $O_2O_2$, and the coplanarity between the axes $O_1O_1$ and $O_2O_2$ around which the $n_1$ and $n_2$ are centered, respectively, is measured using the device according to the present invention.

Figure 7:
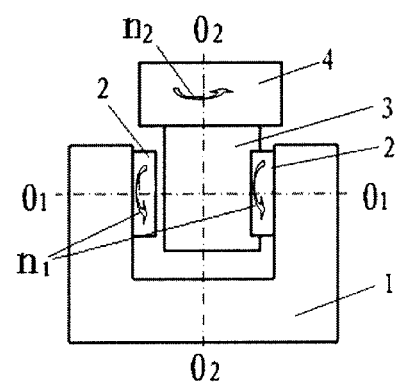
FIG. 7 is a structural schematic view of a clamp-type orthogonal shafts having a built-in intersection (i.e. double pendulum-type orthogonal shafts having a built-in intersection) adaptive to the detecting device and method according to the present invention, wherein the front rotary shaft assembly is swing feeding component, and the rear rotary shaft assembly is a feeding turntable.

FIG. 7 shows the third detecting object adaptive to the detecting device and method according to the present invention, that is, FIG. 7 is a diagram of the clamp-type orthogonal shafts having a built-in intersection (i.e. the double pendulum-type orthogonal shafts having a built-in intersection), wherein the front rotary shaft assembly is swing feeding component, and the rear rotary shaft assembly is a feeding turntable, e.g. in the CNC machine tools, wherein $n_1$ represents the swing of the feed shaft by the component 3 around the feed shaft $O_1O_1$, $n_2$ represents the rotation of the feed shaft by the component 4 (the workbench) around $O_2O_2$, and the coplanarity between the axes $O_1O_1$ and $O_2O_2$ around which the $n_1$ and $n_2$ are centered, is measured using the device according to the present invention.

The device for detecting axis coplanarity of orthogonal rotary shaft having a built-in intersection according to the present invention is also adaptive to a cantilever-type orthogonal shafts having a built-in intersection, such as the A shaft (or B shaft) and the cantilever-type electric spindle of the CNC machine tools, and the corresponding robot wrist joints; the clamp-type orthogonal shafts having a built-in intersection, such as the A shaft (or B shaft) and the electric spindleof the CNC machine tools, and the corresponding robot wrist joints; the double pendulum-type orthogonal shafts having a built-in intersection, such as the double pendulum-type turntable formed by the A shaft (or B shaft) and C shaft of the CNC machine tools, and the corresponding robot wrist joints.

The invention claimed is:

1. A device for detecting axis coplanarity of orthogonal rotary shafts having a built-in intersection, wherein a structure having the orthogonal rotary shaft having a built-in intersection includes a fixing bracket, a front assembly housing (1) and a rear assembly housing (3), the front assembly housing (1) fixedly mounted on the fixing bracket, a front assembly rotary body (2) coaxially connected on the front assembly housing (1), the front assembly rotary body (2) and the rear assembly housing (3) fixedly connected with each other, and the rear assembly rotary body (4) mounted in the rear assembly housing (3);

characterized in that: the measurement device comprises:
a first three dimension movement fine tuning mechanism (5) mounted at an end of the rear assembly rotary body (4), and connecting with a standard sphere (7) through a horizontally set connecting rod (6);
a second three dimensional movement fine tuning mechanism (8) vertically provided below the standard sphere (7), and provided with a first non-contact displacement sensor (a) at an end of the second three dimensional movement fine tuning mechanism (8) corresponding to the standard sphere (7); and
a third three dimensional movement fine tuning mechanism (9) provided corresponding to the horizontal direction of the standard sphere (7), and provided with a second non-contact displacement sensor (b) at an end of the third three dimensional movement fine tuning mechanism (9) corresponding to the standard sphere (7),
wherein the second three dimensional movement fine tuning mechanism (8) and the third three dimensional movement fine tuning mechanism (9) are fixedly mounted on the fixing bracket.

2. The device for detecting axis coplanarity of orthogonal rotary shafts having a built-in intersection according to claim 1, characterized in that: the center of the standard sphere (7), measuring heads of the first and second non-contact displacement sensors (a) and (b) are arranged in a plane containing the rotary axis of the rear assembly rotary body (4) and perpendicular to the rotary axis of the front assembly rotary body (2), wherein in a first detecting status, the measuring head of the first non-contact displacement sensor (a) is parallel with the rotary axis of the rear assembly rotary body (4), and the measuring head of the second non-contact displacement sensor (b) is perpendicular to the rotary axis of the rear assembly rotary body (4), the measuring heads of the first non-contact displacement sensor (a) and second non-contact displacement sensor (b) are aligned with the maximum radius of the standard sphere (7).

3. A precision detecting method for detecting axis coplanarity of orthogonal rotary shafts having a built-in intersection using the device for detecting axis coplanarity of orthogonal rotary shaft having a built-in intersection of claim 1, characterized in that: the detecting method is implemented through the following steps:

step 1: adjusting the first three dimensional movement fine tuning mechanism (5), so as to position the center of the standard sphere (7) in a plane containing the rotary axis of the rear assembly rotary body (4) and perpendicular to the rotary axis of the front assembly rotary body (2), and to enable the vertical distance from the center of the standard sphere (7) to the rotary axis of the front assembly rotary body (2) to be $\sqrt{2}$ times the distance from the center of the standard sphere (7) to the rotary axis of the rear assembly rotary body (4);

step 2: adjusting the second three dimensional movement fine tuning mechanism (8) and the third three dimensional movement fine tuning mechanism (9), so as to position the measuring head of the first non-contact displacement sensor (a) and the measuring head of the second non-contact displacement sensor (b) in a plane containing the rotary axis of the rear assembly rotary body (4) and perpendicular to the rotary axis of the front assembly rotary body (2), wherein the measuring head of the first non-contact displacement sensor (a) is parallel with the rotary axis of the rear assembly rotary body (4), and the measuring head of the second non-contact displacement sensor (b) is perpendicular to the rotary axis of the rear assembly rotary body (4);

step 3: adjusting the second three dimensional movement fine tuning mechanism (8) and the third three dimensional movement fine tuning mechanism (9), so as to align the measuring head of the first non-contact displacement sensor (a) and the measuring head of the second non-contact displacement sensor (b) with the maximum radius of the standard sphere (7), while keeping the measuring heads of the first and second non-contact displacement sensors (a) and (b) in the plane containing the rotary axis of the rear assembly rotary body (4) and perpendicular to the rotary axis of the front assembly rotary body (2), wherein the measuring head of the first non-contact displacement sensor (a) is parallel with the rotary axis of the rear assembly rotary body (4), and the measuring head of the second non-contact displacement sensor (b) is perpendicular to the rotary axis of the rear assembly rotary body (4), so as to adjust the measuring device to a first detecting status;

step 4: reading the measurement value $\delta_{a1}$ of the first non-contact displacement sensor (a) and the measurement value $\delta_{b1}$ of the second non-contact displacement sensor (b) under the first detecting status;

step 5: first, rotating the rear assembly rotary body (4) by 180°, then rotating the front assembly rotary body (2) by 90°, so as to adjust the detecting device to a second detecting status;

step 6: reading the measurement value $\delta_{a2}$ of the first non-contact displacement sensor (a) and the measurement value $\delta_{b2}$ of the second non-contact displacement sensor (b) under the second detecting status;

step 7: comparing the measurement values under the first detecting status and second detecting status, so as to calculate the reading difference $\Delta_a$ of the first non-contact displacement sensor (a) and the reading difference $\Delta_b$ of the second non-contact displacement sensor (b) between the first detecting status and the second detecting status, wherein $\Delta_a = \delta_{a2} - \delta_{a1}$, $\Delta_b = \delta_{b2} - \delta_{b1}$; and step 8: comparing $\Delta_a$ and $\Delta_b$, wherein when the difference between $\Delta_a$ and $\Delta_b$ is smaller than or equal to a preset value, the offset value e of the axis coplanarity of the orthogonal rotary shafts having a built-in intersection can be obtained through the following formula:

$$e = (\Delta_a + \Delta_b)/2; \text{ and}$$

when the difference between $\Delta_a$ and $\Delta_b$ is larger than the preset value, fine tuning the first three dimensional movement fine tuning mechanism (5) so as to slightly change the position of the center of the standard sphere (7), while keeping the center of the standard sphere (7) in the plane containing the rotary axis of the rear assembly rotary body (4) and perpendicular to the rotary axis of the front assembly rotary body (2), and rotating the rear assembly rotary body (4) by 180° first, then rotating the front assembly rotary body (2) by −90°; and repeating steps 3-8, until $\Delta_a \approx \Delta_b$.

* * * * *